April 9, 1935. A. W. MORRIS 1,996,970
LEMON SQUEEZER
Filed Aug. 29, 1933
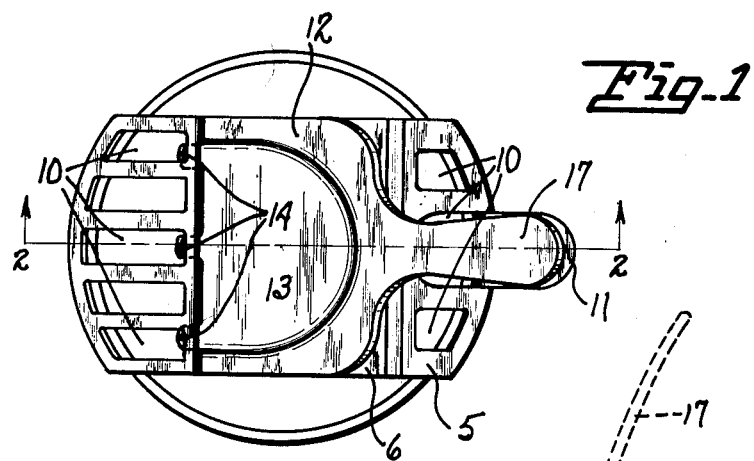
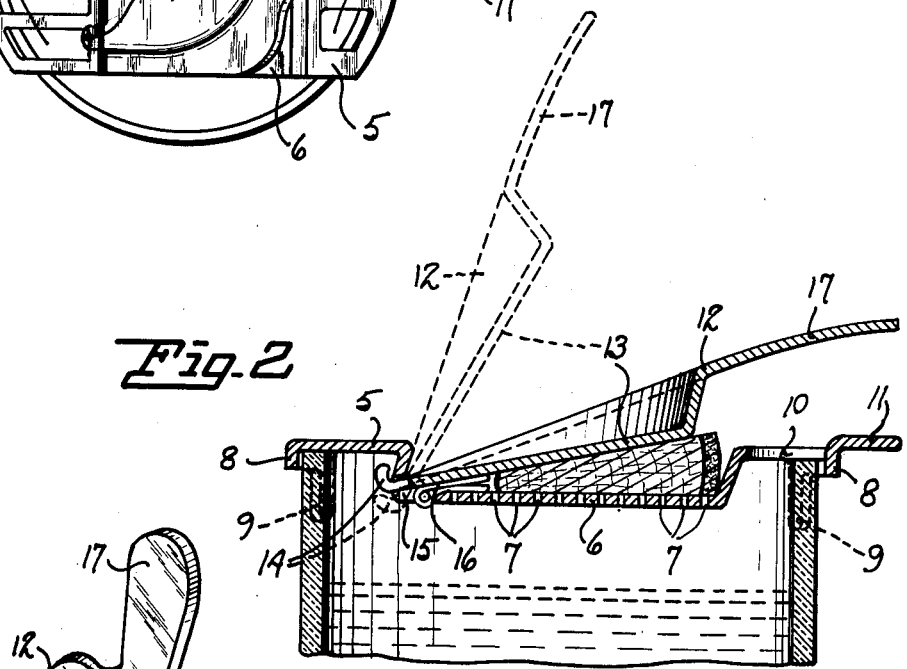
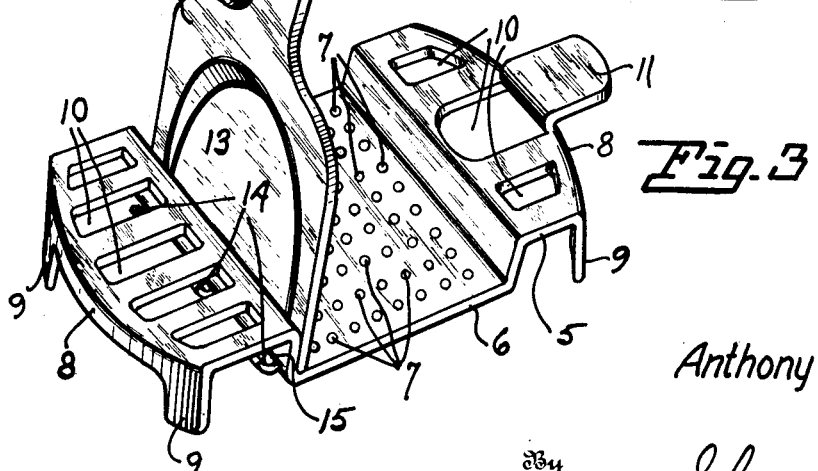
Inventor
Anthony W. Morris
By Glenn L. Fish
Attorney Patented Apr. 9, 1935

1,996,970

UNITED STATES PATENT OFFICE 1,996,970

LEMON SQUEEZER

Anthony W. Morris, Spokane, Wash.

Application August 29, 1933, Serial No. 687,294

1 Claim. (Cl. 100—41)

My invention relates to lemon squeezers and more particularly to a device for squeezing the juice from a portion of a lemon or other citrus fruit into a glass of liquid such as ice tea, or upon fish or the like. Certain objects of the invention are to provide a novel and simple device of inexpensive construction, made of pressed metal or moulded material, and by means of which the juice may be squeezed out of a piece of lemon or the like without the objectionable and unsanitary contact of the fingers with the lemon.

With the above and other objects in view which will appear as the description proceeds, the invention consists of the novel construction, adaptation, combination and arrangement of parts hereinafter described and claimed. These objects are accomplished by devices illustrated in the accompanying drawing wherein; Figure 1 is a top plan view showing the device in position on the top of a drinking glass; Fig. 2 is a view in central vertical section taken on a broken line 2—2 of Fig. 1; and Fig. 3 is a detail view in perspective of the device.

Referring to the drawing throughout which like reference numerals indicate like parts, the numeral 5 designates the lower fixed base member of the device whose central portion is depressed to form a lower jaw portion 6 which portion is provided with perforations 7 for the passage of juice. The two ends of said base member are provided with a depending flange 8 and the outer ends of each flange depends further to form legs 9. Apertures 10 are provided in the end portions of said base member in order to decrease its weight and increase its artistic appearance. The metal from the rear central one of said apertures is bent backward to form a lower stub handle 11.

The major portion of the upper movable member 12 is depressed to form a jaw portion 13. A plurality of fingers 14 project from the forward end of said movable member. Said fingers extend through corresponding slots 15 in the forward end of the lower jaw 6 and are bent upwardly thus pivotally and hingedly connecting the upper movable and the lower fixed members. A spring 16 is connected to the forward end of the lower jaw 6 and normally retains the upper movable member 12 in the raised position shown in dotted lines in Fig. 2. The rear end of said upper member is provided with a handle 17.

Referring to Fig. 2, in the use of the device it is placed upon the top of a drinking glass with its depending flanges 8 engaging the upper and outer edges of the glass and thus retaining the device in place. A segment of a lemon is then placed upon the lower jaw portion 6 with its rind against the rear end of said jaw. By means of the thumb and forefinger engaging the upper and lower handles 11 and 17 respectively, the upper movable member 12 is then pressed down against the segment of lemon thus squeezing the juice out of same. It will be noted in Fig. 2 that a space is left between the rear ends of the jaws 6 and 13 so that the upper jaw will miss the rind of the lemon and will thereby remove all the juice from same. When squeezing juice upon a piece of fish or the like, the legs 9, of course, rest upon a dish. The device is economical in the use of lemon as one piece of lemon may be used by several people without the fingers coming into contact with same.

Having thus described my invention, it being understood that minor changes in its construction and arrangement may be resorted to without departing from the scope and spirit of the invention, what I claim and desire to secure by Letters Patent of the United States is:—

A lemon squeezer comprising a lower stationary base member, flanges depending from the ends of said base member and legs depending from the outer ends of said flanges, a handle for said member, said base member having a depressed jaw portion with perforations therethrough and a plurality of slots through its forward end, an upper movable member, a plurality of upwardly curved fingers projecting from the forward end of said upper member and detachably extending through the slots in the forward end of the base member, said upper member having a depressed jaw portion adapted to fit into the depressed jaw portion of the base member, and said upper depressed jaw being shorter than the lower jaw whereby a space is left between the rear ends of said jaws when they are brought together.

ANTHONY W. MORRIS.